United States Patent
Papp et al.

(10) Patent No.: US 10,297,064 B2
(45) Date of Patent: May 21, 2019

(54) MULTI-REPRESENTATION DEPENDENCY GRAPHS

(71) Applicant: DreamWorks Animation LLC, Glendale, CA (US)

(72) Inventors: Esteban D. Papp, Los Angeles, CA (US); Stuart Bryson, Neutral Bay (AU)

(73) Assignee: Dreamworks Animation L.L.C., Universal City, CA (US)

( * ) Notice: Subject to any disclaimer, the term of this patent is extended or adjusted under 35 U.S.C. 154(b) by 101 days.

(21) Appl. No.: 14/860,631

(22) Filed: Sep. 21, 2015

(65) Prior Publication Data

US 2017/0084061 A1 Mar. 23, 2017

(51) Int. Cl.
*G06T 11/20* (2006.01)
*G06T 13/20* (2011.01)
*G06T 13/80* (2011.01)
*G06T 17/00* (2006.01)

(52) U.S. Cl.
CPC ............ *G06T 13/20* (2013.01); *G06T 11/206* (2013.01); *G06T 13/80* (2013.01); *G06T 17/005* (2013.01); *G06T 2210/61* (2013.01)

(58) Field of Classification Search
None
See application file for complete search history.

(56) References Cited

U.S. PATENT DOCUMENTS

| | | | |
|---|---|---|---|
| 6,154,215 A | 11/2000 | Hopcroft et al. | |
| 2003/0011637 A1 | 1/2003 | Boudier | |
| 2004/0252902 A1* | 12/2004 | Vienneau | G06T 11/60 382/240 |
| 2007/0080964 A1 | 4/2007 | Kainz et al. | |
| 2013/0194279 A1 | 8/2013 | Watt et al. | |
| 2014/0035922 A1* | 2/2014 | Watt | G06F 11/323 345/440 |

OTHER PUBLICATIONS

Extended European Search Report received for European Patent Application No. 16189617.0, dated Jan. 4, 2017, 8 pages.
Office Action received for European Patent Application No. 16189617.0, dated May 16, 2018, 7 pages.
Summons to Attend Oral Proceedings received for European Patent Application 16189617.0, dated Jan. 24, 2019, 10 pages.

* cited by examiner

*Primary Examiner* — Sarah Le
(74) *Attorney, Agent, or Firm* — Dentons US LLP

(57) ABSTRACT

Systems and methods for multi-representation dependency graphs are disclosed. A first representation of a dependency graph may be accessed using a processor. The first representation of the dependency graph may have a first type and include a plurality of nodes. A transition of the first representation of the dependency graph from a first state to a second state may be detected using the processor. In response to a detection of the transition of the first representation of the dependency graph from the first state to the second state, a second representation of the dependency graph may be updated. The second representation may have a second type different than the first type and include a plurality of tasks corresponding to the plurality of nodes. The second representation may further include one or more dependencies corresponding to one or more of the connections of the first representation.

28 Claims, 8 Drawing Sheets

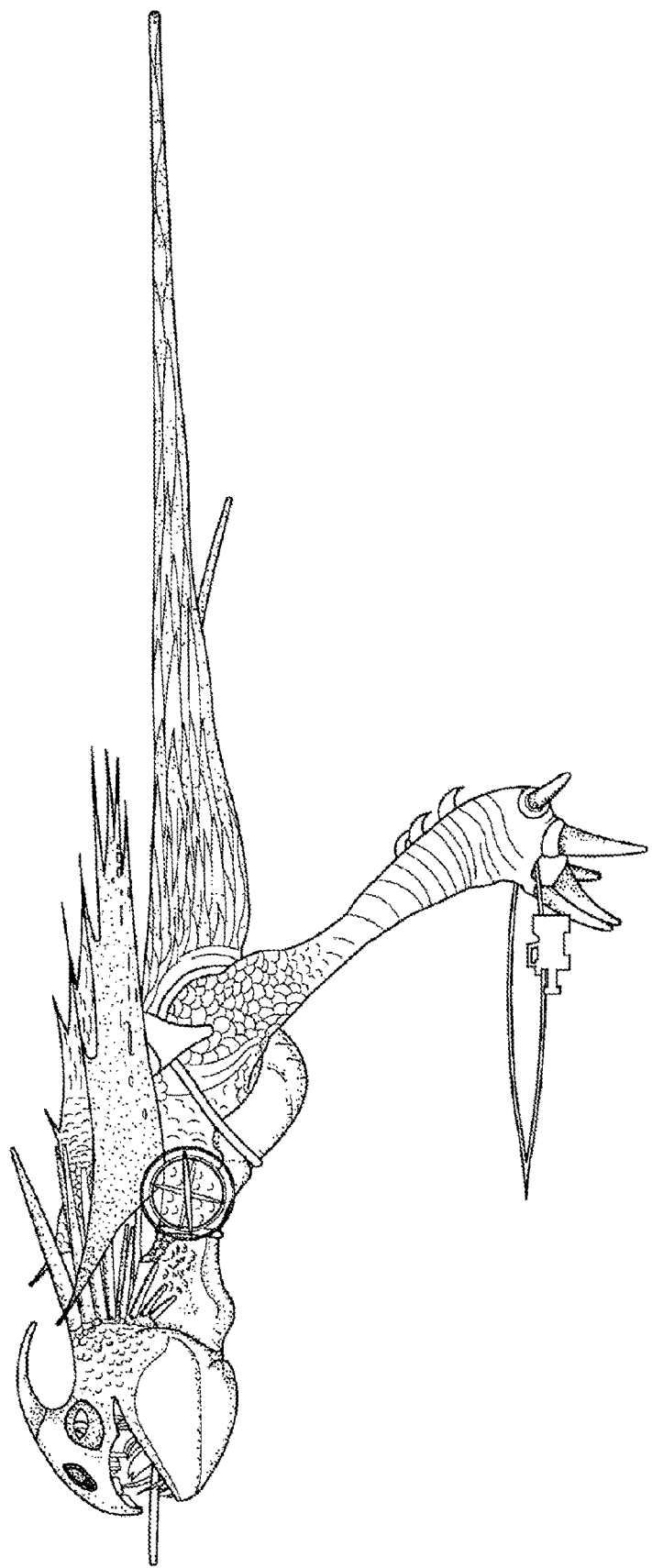

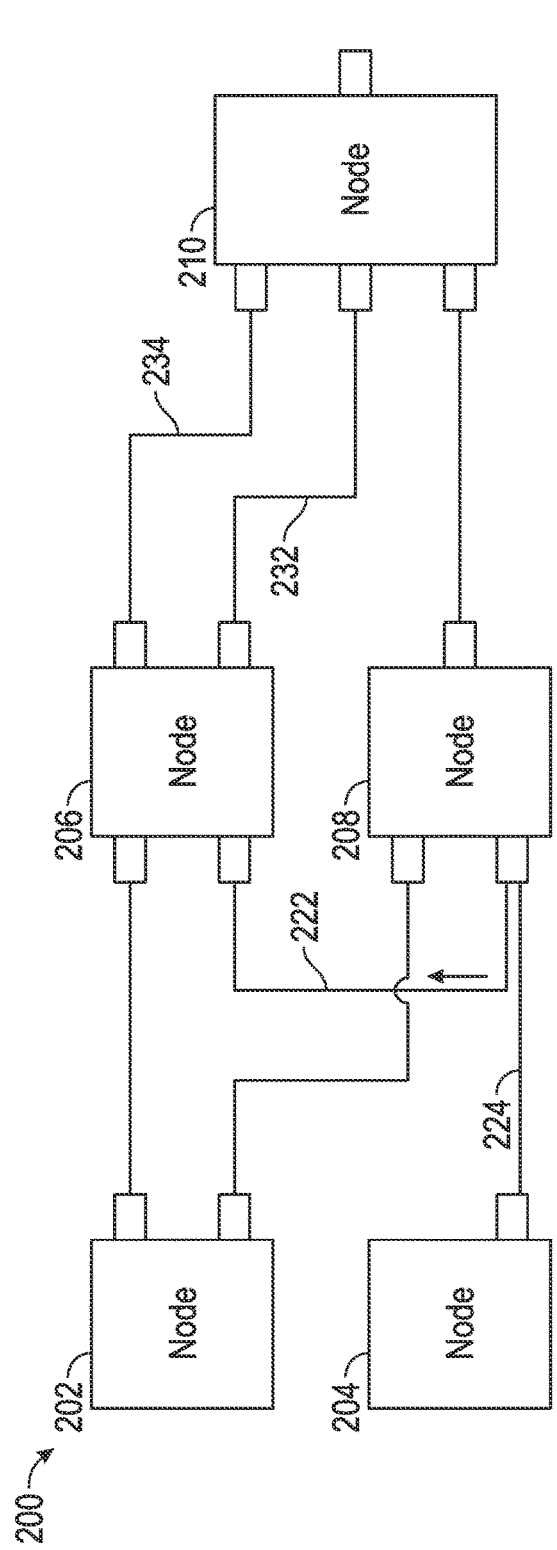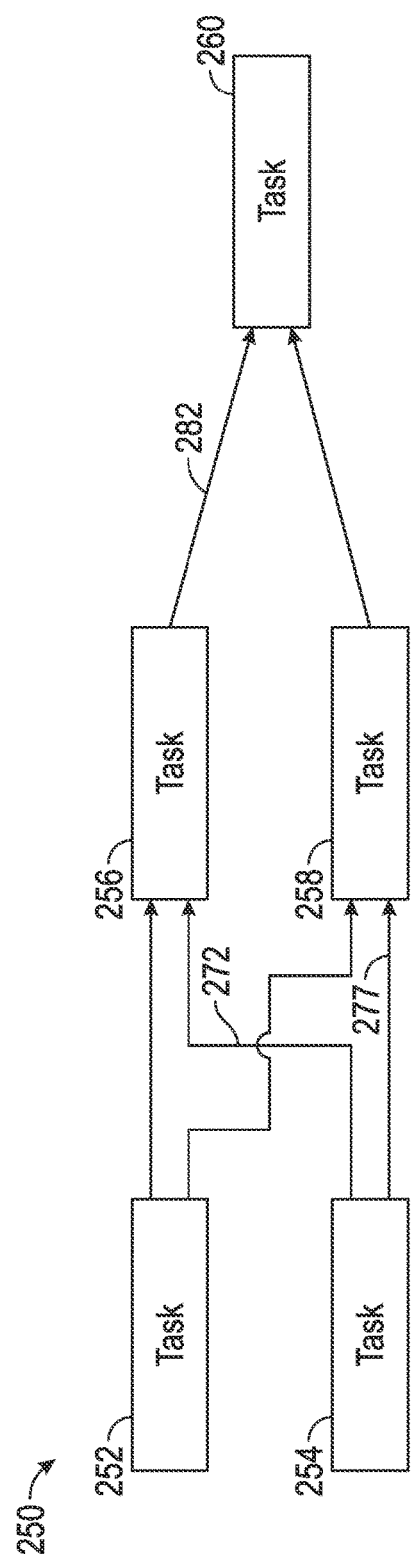
FIG. 2A
FIG. 2B

MULTI-REPRESENTATION DEPENDENCY GRAPHS

FIELD

The present disclosure relates to computer-generated animation and, more specifically, to evaluation of a dependency graph for computer-generated animation.

BACKGROUND

Media productions typically use dependency graphs to render, animate, or otherwise describe a scene in an animation. Dependency graphs can include a system of interconnected nodes that perform computations on input data, such as input attributes, and produce output data, such as output attributes. A node may have multiple input attributes and multiple output attributes, as well as other attributes.

As media productions create increasingly realistic animations, the complexity of and number of nodes in dependency graphs used to support these animations increases significantly. As a result, the time and computational resources required to evaluate dependency graphs increases as well. Accordingly, there is a need to more efficient dependency graph evaluation.

SUMMARY

Systems and methods for multi-representation dependency graphs are disclosed. In an example method, a first representation of a dependency graph may be accessed using a processor. The first representation of the dependency graph may have a first type and include a plurality of nodes. A transition of the first representation of the dependency graph from a first state to a second state may be detected using the processor. In response to a detection of the transition of the first representation of the dependency graph from the first state to the second state, a second representation of the dependency graph may be updated. The second representation may have a second type different than the first type and include a plurality of tasks corresponding to the plurality of nodes.

BRIEF DESCRIPTION OF THE FIGURES

The present application can be best understood by reference to the following description taken in conjunction with the accompanying drawing figures, in which like parts may be referred to by like numerals.

FIGS. 1A-1C illustrate a sequence of rendered frames according to an embodiment of the present invention.

FIG. 2A illustrates an exemplary authoring representation of a dependency graph according to an embodiment of the present invention.

FIG. 2B illustrates an exemplary evaluation representation of a dependency graph according to an embodiment of the present invention.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Figure 1B:
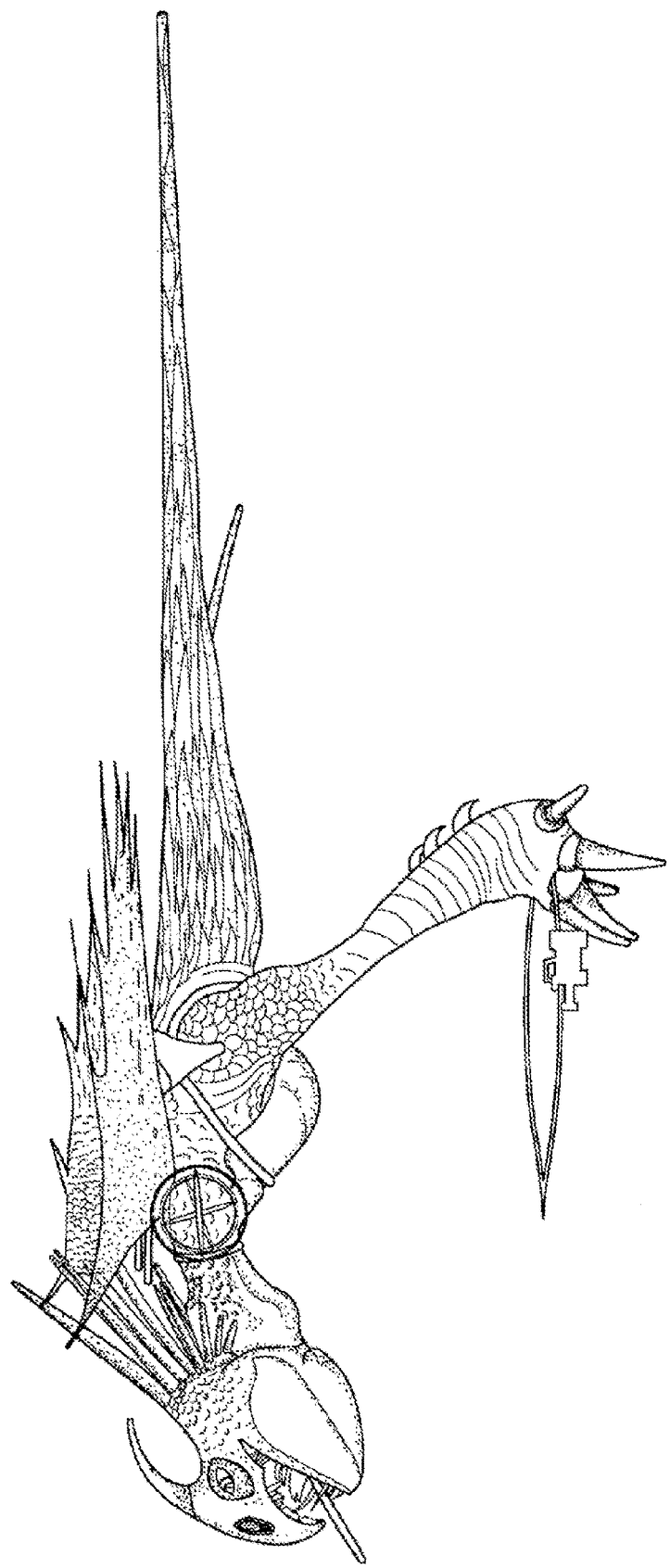
Figure 1C:
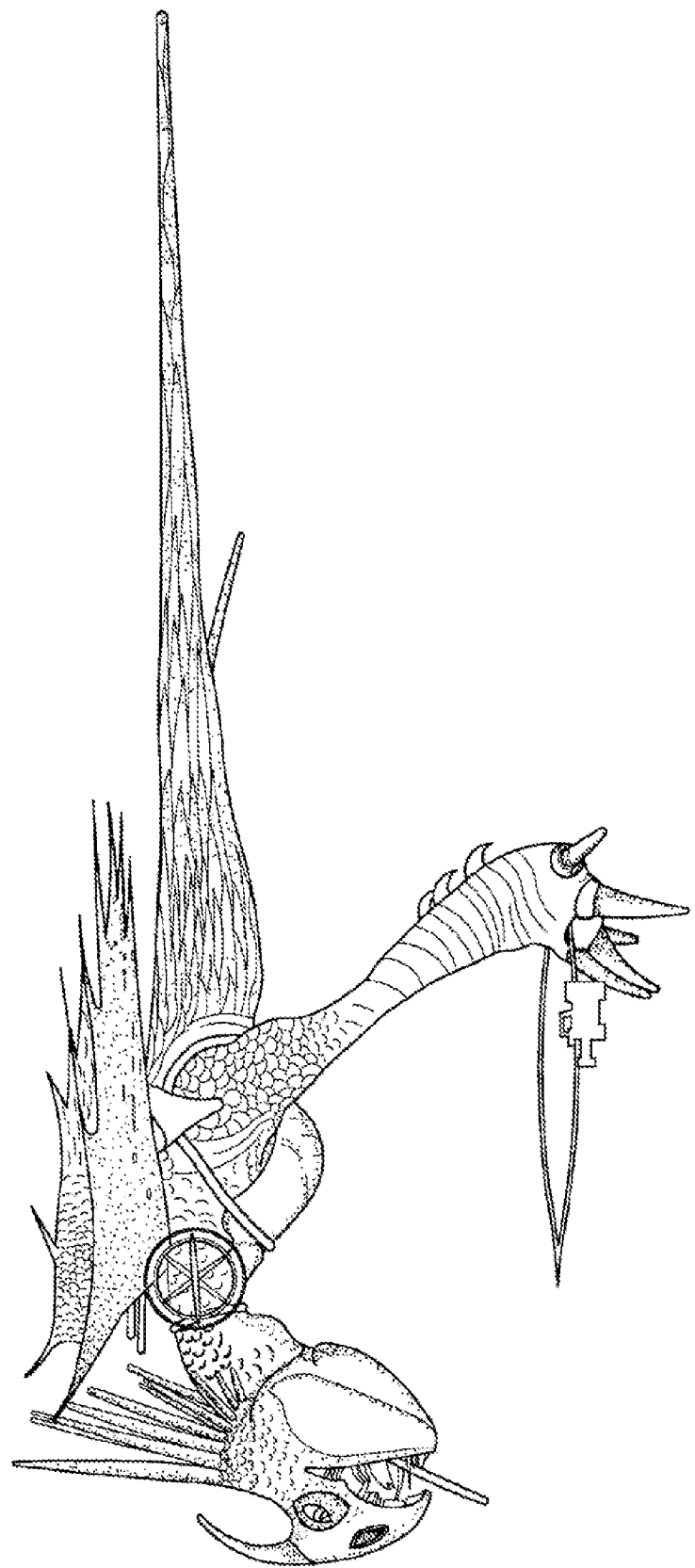

FIGS. 1A-1C illustrate a sequence of frames according to an embodiment of the present invention. Each frame of the sequence is provided (e.g., rendered) using a dependency graph that describes, inter alia, the illustrated character during the sequence. It will be appreciated that while description of frames is made herein, other image types, such as fields or pictures, may be provided. In some instances, the frames are provided by adjusting a value of an attribute of a node included in the dependency graph. By way of example, movement of the character's neck may be implemented by adjusting a value of an input attribute of a transformation node included in the dependency graph.

In some examples, a dependency graph having a single representation may be authored and subsequently evaluated to provide a sequence of frames. For example, a dependency graph may be authored such that the dependency graph includes nodes (e.g., transformation nodes) and attributes (e.g., input attributes, output attributes) associated with the nodes. Generally, attributes may refer to parameters of nodes that can be controlled through the system. Input attributes include attributes of a node that may be set by the system or by another node, and output attributes include attributes of a node that may be read by the system or accessed by another node. By way of example, because a transformation node may determine the scale, rotation, and/or location of an element along one or more of the X, Y and Z axes, a change in the value of an input attribute (e.g., rotation input attribute) of the transformation node may result in a change to the value of an output attribute (e.g., rotation display output attribute) of that transformation node.

To determine the value of an output attribute, the transformation node may be evaluated. Evaluation may include computation, execution, or calculation, for instance, of one or more functions of a node and/or one or more values of input attributes. For example, the transformation node may determine the value of one or more output attributes, and accordingly, the location of the character's neck, using matrix multiplication. When the value of a specific output attribute of a node is requested, the system may evaluate the node to compute that specific output attribute. This may be referred to as evaluating the output attribute of the node. Alternatively, a node may be evaluated to compute all output attributes of the node. The change in the value of the output attribute of the transformation node of the character's neck may be propagated through the dependency graph when the dependency graph is evaluated. In this example, this may result in a change in the value of the character's output attributes, causing the appearance of the movement of the character's neck when the sequence of frames is provided.

Because the input attributes of the transformation node of the character's legs have not changed throughout the sequence, the position of the character's legs has also not changed throughout the sequence. Accordingly, once the transformation node associated with the character's legs has been evaluated for the first frame, the value(s) of the transformation node may be stored (e.g., cached) for use in subsequent frames and need not be reevaluated for each subsequent frame. Generally, nodes that require reevaluation are tracked, for instance, using a data structure referred to herein as a "dirty list." Those nodes requiring reevaluation are identified as "dirty" in the dirty list. Typically, nodes are identified as dirty in response to an input attribute of the node changing in value. Because input attributes of one or more other nodes may rely on the value of an output attribute of a dirty node, one or more downstream nodes may be identified as dirty as well. Dirty lists may be used as described in U.S. patent application Ser. No. 13/605,966, "Optimizing Graph Evaluation," filed Sep. 6, 2012, which is hereby incorporated by reference in its entirety. Reference is made herein to "dirty nodes," which is intended to refer to those nodes having one or more attributes identified as dirty. Once a dirty node has been evaluated, it is no longer considered dirty. Typically, an evaluation process may include evaluation planning in which nodes requiring evaluation, or dirty nodes, are identified and thereafter evaluated. In some examples, and as will be described in more detail below, tasks corresponding to nodes and requiring evaluation may be tracked instead of, or in addition to, nodes themselves.

Single-representation dependency graphs include a significant amount of data including but not limited to data corresponding to various nodes, node parameters, attributes, and connections between attributes (e.g., a connection between an output attribute and an input attribute). As a result, evaluation of single-representation dependency graphs is often computationally demanding. Because in some instances it may be desirable to edit and evaluate a dependency graph frequently and/or more efficiently than is typical with single-representation dependency graphs, use of a single-representation dependency graph may not be suitable for all dependency graph based applications.

Accordingly, in some embodiments, a multi-representation dependency graph, or a dependency graph having multiple representations, may be used to provide a sequence of frames. For example, a first representation (e.g., an authoring representation) of the dependency graph may be used to author the dependency graph and a second representation (e.g., an evaluation representation) of the dependency graph may be used to evaluate the dependency graph.

FIGS. 2A-B illustrate multiple representations of a dependency graph according to an embodiment of the present invention. FIG. 2A, for example, illustrates an exemplary authoring representation 200 of a dependency graph. The authoring representation 200 includes nodes 202-210, each of which may include one or more attributes (e.g., input attributes), as described. As illustrated, each attribute of a node may be connected to one or more other attributes of a same or different node. By way of example, a first output attribute of the node 202 may be connected to an input attribute of the node 206, and a second output attribute of the node 202 may be connected to an input attribute of the node 208. As another example, first and second output nodes of the node 206 may be connected to respective input nodes of the node 210. In some examples, the authoring representation 200 may be used to implement a single-representation dependency graph.

Each node of the authoring representation 200 may be a node having one or more node types. By way of example, each node of the authoring representation 200 may be an operator node, an input node, a selector node, a constraint node, a simulation node, an output node, or a combination or sub-combination thereof. It will be appreciated that the enumerated types of nodes specified herein are not intended to be limiting and that one or more other types of nodes may be used to implement nodes of the authoring representation 200. In some examples, attributes of a node may be based on the type of the node. A selector node, for instance, may have multiple input attributes, a selector attribute (e.g., to select one or more particular inputs), and one or more output attributes. In this manner, a selector node may serve as a multiplexer.

During authoring processes of the authoring representation 200, one or more nodes may be added, removed, and/or modified. Further, nodes may be connected to one or more other nodes, disconnected from one or more other nodes, associated with a value, or any combination thereof. It will be appreciated that while reference is made herein to nodes being connected, disconnected, and/or associated with a value, in some examples this may refer to attributes of nodes being connected, disconnected, and/or associated with a value, respectively. By way of example, if first and second nodes are connected, this may refer to an output attribute of the first node being connected to an input attribute of the second node.

FIG. 2B illustrates an exemplary evaluation representation 250 of a dependency graph according to an embodiment of the present invention. The evaluation representation 250 includes tasks 252-260. As will be described in further detail, each of the tasks may be dependent on one or more other tasks. By way of example, the task 256 may depend on the task 252 and the task 258 may depend from each of the task 252 and the task 254.

During evaluation processes of the evaluation representation 250, one or more tasks may be evaluated, for instance, to compute one or more values for providing a frame. Because a task being evaluated may depend on other tasks, evaluating a task may include evaluating one or more "upstream" tasks from which the task depends. By way of example, because the task 260 depends on tasks 256, 258, evaluating the task 260 may include evaluating at least one of the tasks 256, 258. In other examples, evaluating the task 260 may include evaluating neither of the tasks 256, 258. Similarly, because each of the tasks 256, 258 depends on tasks 252, 254, evaluating either of the tasks 256, 258 may include evaluating at least one of the tasks 252, 254. In other examples, evaluating either of the tasks 256, 258 may include evaluating neither of the tasks 252, 254.

In some embodiments, an evaluation representation may be based on a corresponding authoring representation. The evaluation representation 250 may, for instance, be provided (e.g., generated) using the authoring representation 200. In some examples, one or more tasks of the evaluation representation 250 may correspond to one or more nodes of the authoring representation 200. Each of the nodes 202-210 may correspond to the tasks 252-260, respectively, for example. Moreover, one or more connections of the evaluation representation 250 may correspond to one or more dependencies of the authoring representation 200. Connection 222 and connection 224 may correspond to dependency 272 and dependency 277, respectively, and one or more of connections 232, 234 may correspond to the dependency 282.

Although the evaluation representation 250 is illustrated as having a number of tasks, each of which may correspond to respective node of the authoring representation 200, in some examples each task of the evaluation representation 250 may not correspond to a respective node. The evaluation representation 250 may include, for example, multiple tasks that correspond to a single node of the authoring representation 200, or may include one or more tasks that do not correspond to any node of the authoring representation 200. Similarly, dependencies of the evaluation representation 250 may not respectively correspond to connections of the authoring representation 200 in some embodiments. Multiple connections of the authoring representation 200 may correspond to a single dependency of the evaluation representation 250 and/or a single connection of the authoring representation 200 may correspond to multiple dependencies of the evaluation representation 250. Furthermore, corresponding connections and dependencies may be translated in any manner. As an example, while the connection 222 is associated with nodes 206, 208 (recall that these nodes correspond to tasks 256, 258), the dependency 272 corresponding to the connection 222 is associated with tasks 254, 256 (recall that these tasks correspond to nodes 204, 206). Translation of nodes and connections to tasks and dependencies, respectively, may be based on one or more optimization processes, described in further detail below. Connections translated in this manner may be referred to as "shortcuts" herein.

As described, a node requiring evaluation may be referred to as a dirty node, and evaluation may include evaluation planning, where dirty nodes are identified such that only dirty nodes are evaluated during evaluation. Similarly, a task corresponding to a dirty node may be referred to herein as a dirty task, and evaluation planning may include identifying dirty tasks such that only dirty tasks are evaluated during evaluation.

Figure 3A:
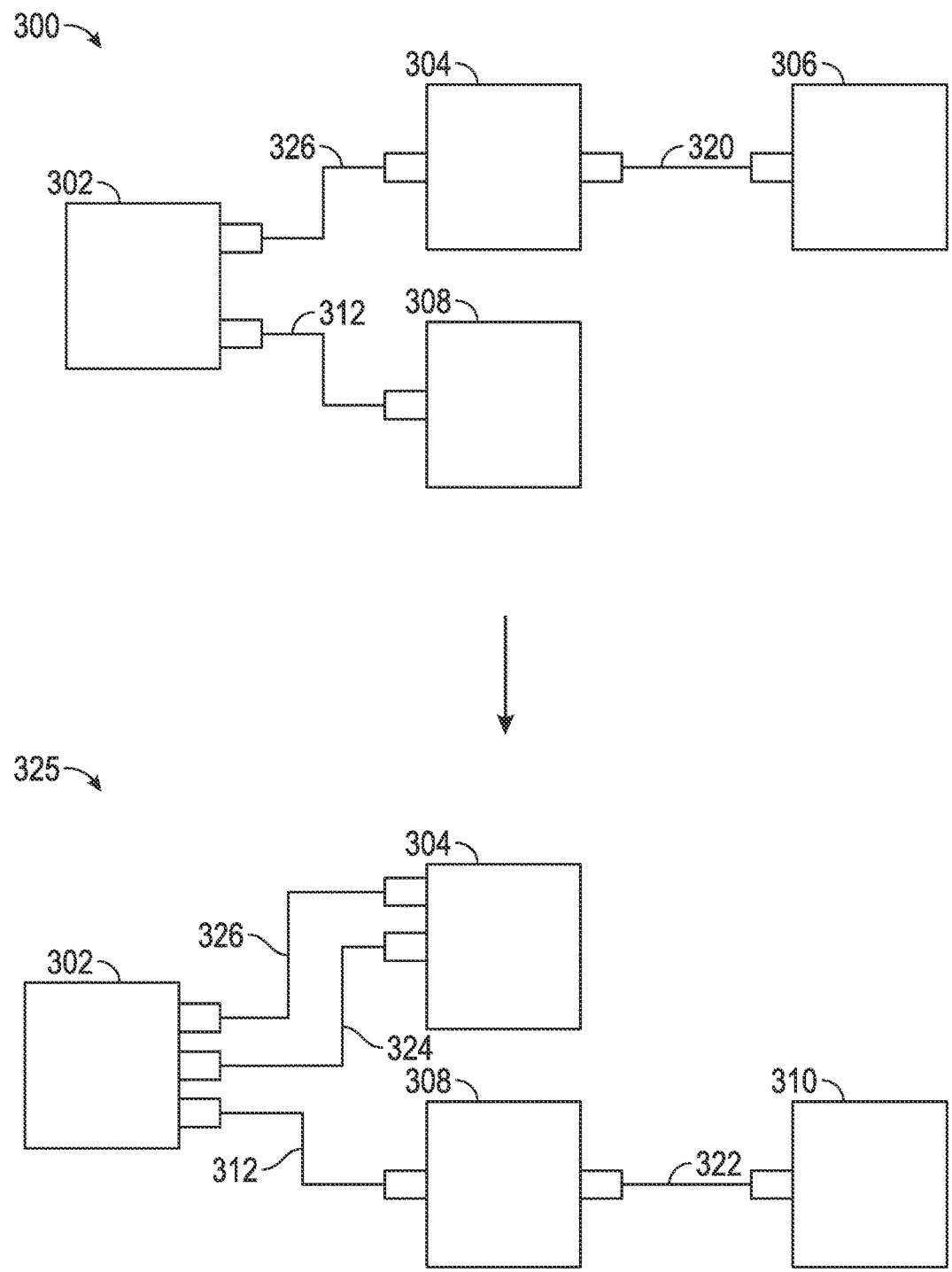
FIG. 3A illustrates an exemplary modification to an authoring representation of a dependency graph according to an embodiment of the present invention.
Figure 3B:
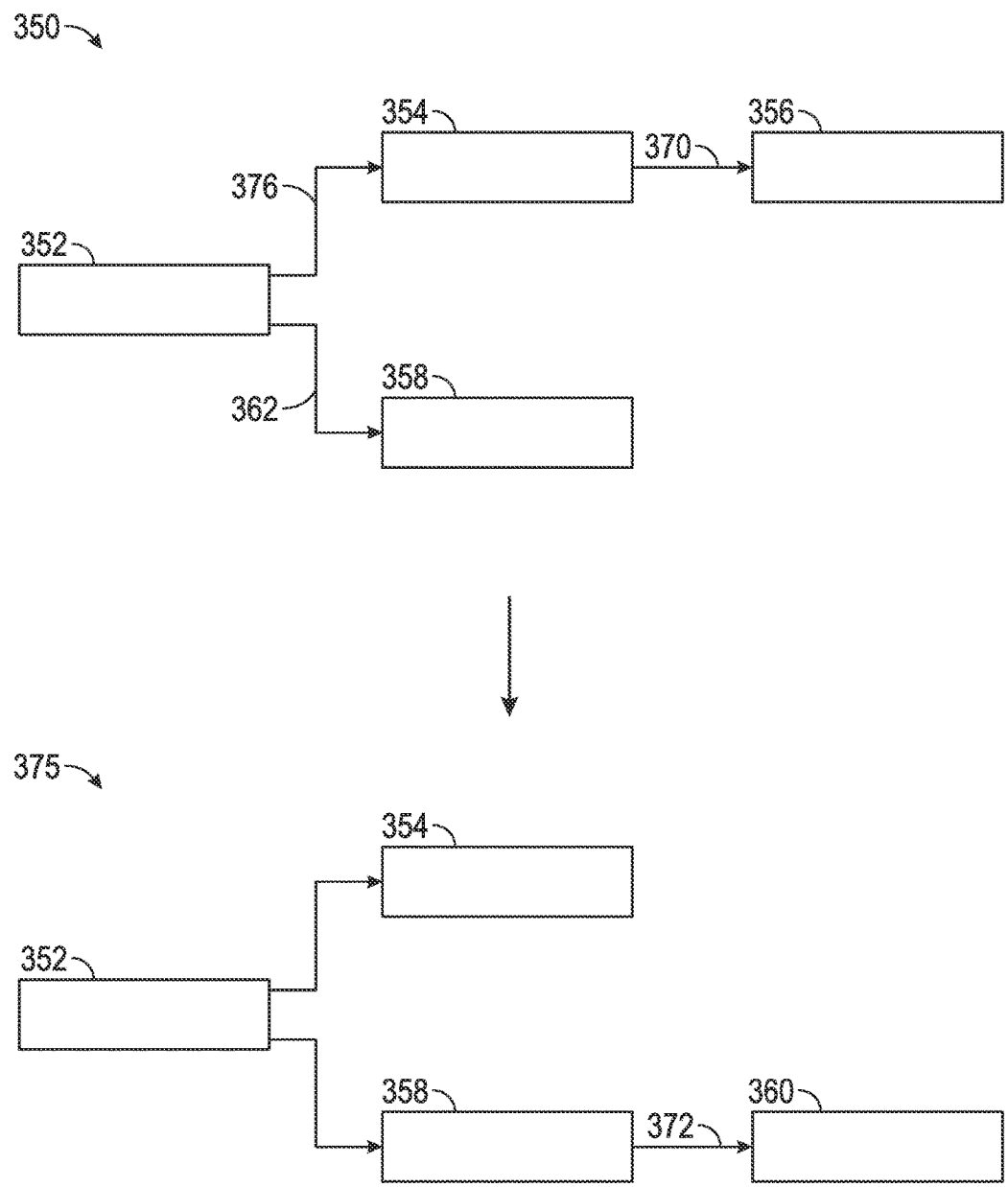
FIG. 3B illustrates an exemplary update of an evaluation representation of a dependency graph according to an embodiment of the present invention.

FIGS. 3A-3B illustrate the manner in which a modification to an authoring representation may result in an update of an evaluation representation according to an embodiment of the present invention. With reference to FIG. 3A, an authoring representation 300 includes nodes 302-308, each of which may be connected to one or more other nodes. For example, the node 302 is connected to nodes 304 and 306 via connections 326 and 312, respectively, and the node 304 is further connected to node 306 via connection 320.

With reference to FIG. 3B, an evaluation representation 350 may correspond to the authoring representation 300. The evaluation representation 350 may include tasks 352-358 which may correspond to nodes 302-308 of the authoring representation 300, respectively. Each of the tasks 352-358 further may depend from one or more other tasks. The tasks, 354, and 358, for example, may depend from the task 352 via dependencies 376 and 362, respectively. The task 356 may depend from the task 354 via dependency 370. The dependencies 376, 362, and 370 of the evaluation representation 350 may correspond to connections 326, 312, and 320 of the authoring representation 300, respectively.

In some examples, the authoring representation 300 may be modified, for instance by a user, to provide the authoring representation 325. The authoring representation 300 may be modified by deleting the node 306 and the connection 320 and adding a node 310 and a connection 322. An additional connection 324 between the node 302 and the node 304 may be added as well.

In response to the authoring representation 300 being modified to provide the authoring representation 325, the evaluation representation 350 may be updated to provide the evaluation representation 375. The evaluation representation 350 may be updated, for instance, by deleting the task 356 and the dependency 370 and adding the task 360 and dependency 372.

In some examples, the evaluation representation 350 may be updated in real time. Accordingly, for each modification of the authoring representation 300, the evaluation representation 350 may be updated (e.g., automatically updated) in response. Accordingly, with reference to FIGS. 3A-B, in some examples the evaluation representation 350 may be updated a first time in response to deletion of the connection 320 (e.g., to remove the dependency 370), updated a second time in response to deletion of the node 306 (e.g., to remove the task 356), updated a third time in response to addition of the node 310 (e.g., to add the task 360), and updated a fourth time in response to addition of the connection 322 (e.g., to add the dependency 372). The evaluation representation 375 may not be updated in response to the addition of the connection 324 in some examples. It will be appreciated that the order in which each modification is implemented is given by way of example only and modifications to the authoring representation 300 may be implemented in any order. In some examples, the evaluation representation 350 may be updated in response to a particular number of modifications made to the authoring representation 300. For example, the evaluation representation may be updated in response to every 2 modifications of the authoring representation 300.

The evaluation representation 350 may be updated in other manners as well. As an example, the evaluation representation 350 may be updated periodically. Updates may be implemented after a predetermined period of time has elapsed and/or after a predetermined period of time has elapsed in which the authoring representation 300 has not been modified. The evaluation representation 350 may be updated, for instance, in response to the authoring representation 300 not being modified for a period of 15 seconds. In some embodiments, the evaluation representation 350 may be updated in response to a user request. As yet another example, the evaluation representation 350 may be selectively updated based on a type of an update of the authoring representation 300. For instance, the evaluation representation 350 may be updated only in response to the addition or deletion of a node of the authoring representation 300.

In some examples, updates made to an evaluation representation are made in accordance with a set of update rules. Such update rules may govern the manner in which tasks and dependencies are added, removed, and/or modified during an update of an evaluation representation. Table 1 illustrates an exemplary list of update rules that may be used in accordance with one or more described embodiments. Further description of each rule set forth in Table 1 is set forth below.

TABLE 1

| Modification of Authoring Rep. | Update of Evaluation Rep. |
| --- | --- |
| add operator node | add operator task having evaluation function; mark task dirty |
| add input node | add input task having a single value entry; mark task dirty |
| add selector node | add selector task that provides selected input; mark task dirty |

TABLE 1-continued

| Modification of Authoring Rep. | Update of Evaluation Rep. |
|---|---|
| add constraint node | add constraint task; mark task dirty |
| add simulation node | add simulation task; mark task dirty |
| delete node | remove corresponding task |
| add connection | selectively create shortcut; if no other connection to attribute of upstream node, add dependency; optionally, combine linear tasks; mark downstream tasks dirty |
| remove connection (disconnect node) | resolve surrounding shortcuts; if no other connections to attribute of upstream node, remove corresponding dependency; mark downstream tasks dirty |
| set value of node | for corresponding task, mark downstream tasks dirty; if simulation task, mark time-based attributes of dependent frames dirty |

In response to the addition of a node in an authoring representation, for example, a task may be selectively added to an evaluation representation. In response to deletion of a node in an authoring representation, a task may be selectively deleted from an evaluation representation. Similarly, the addition or deletion of a connection in an authoring representation may result in a dependency being selectively added or deleted from an evaluation representation.

Because each node added to an authoring representation may have a particular type, each task added to an evaluation representation in response to the addition of a node may have a type corresponding to the type of the added node. In response to the addition of an operator node in an authoring representation, for instance, an operator task, or a task including an evaluation function, may be added to the corresponding evaluation representation. The evaluation function of the task may correspond to an operation of the operator node. To ensure subsequent evaluation of the task, the task is marked dirty.

In response to the addition of an input node in an authoring representation, an input task, or a task configured to provide a single value, may be added to the corresponding evaluation representation. The task may, for instance, provide a static value, may provide a value based on an output of one or more other tasks, and/or may provide a value provided by an animation curve or an external entity (e.g., an entity external to dependency graph). To ensure subsequent evaluation of the task, the task is marked dirty.

In response to the addition of a selector node in an authoring representation, a selector task, or a task that provides a single output, may be added to the corresponding evaluation representation. As described, a selector node may serve as a multiplexer in some examples. During evaluation planning of the selector task, a determination is made as to whether an upstream dependency of the selector node is valid based on a selection index. Inputs of the selector node not selected by the selection index are ignored for evaluation purposes. Accordingly, the output provided by the selector task may correspond to only the input of the selector node selected by the selection index at the time of evaluation planning, thereby reducing the number of upstream tasks that need be evaluated. To ensure subsequent evaluation of the task, the task is marked dirty.

In response to the addition of a constraint node in an authoring representation, a constraint task may be added to the corresponding evaluation representation. To ensure subsequent evaluation of the task, the task is marked dirty. During evaluation planning of a constraint task, a determination is made as to whether a parent task of the constraint task is dirty. If the parent task is not dirty, a value (e.g., position) of the parent task is retrieved from an internal value cache. If the parent task is dirty, the parent task is planned for evaluation (e.g., handled as if dirty).

In response to the addition of a simulation node in an authoring representation, a simulation task may be added to the corresponding evaluation representation. Typically, while a simulation node may access one or more values of a current frame, the simulation node may access values of one or more other frames as well. Accordingly, during evaluation planning of a simulation task, a determination is made as to whether a value of another frame (e.g., dependent frame) is dirty. If the value of the dependent frame is not dirty, evaluation planning is resumed. If the value of the dependent frame is dirty, evaluation of the simulation task is planned for another frame. To ensure subsequent evaluation of the task, the task is marked dirty.

In some examples, nodes described herein may provide values having a particular type to other nodes. Types of values provided in this manner may include floats, integers, strings, and other types known in the art, now or in the future. To ensure compatibility between nodes, in some examples, value adapter nodes are inserted between nodes to perform type conversion. A value adapter node may, for instance, convert an integer to a float. Accordingly, in response to the addition of a value adapter node to an authoring representation, a task of the evaluation representation may be modified and/or configured to modify types of received values (e.g., integer to float). Moreover, in some embodiments, value adapters are not added to the authoring representation, but rather connections requiring a type conversion are identified and tasks of the evaluation representation are updated accordingly. In this manner, type incompatibilities may be resolved without adding additional nodes to the authoring representation.

Other modifications to an authoring representation may cause the corresponding evaluation representation to be updated as well. In response to the deletion of a node of an authoring representation, a task corresponding to the deleted node may be deleted from the corresponding evaluation representation. One or more dependencies associated with the task may be deleted as well in some examples.

In response to the addition of a connection between nodes of an authoring representation, a dependency may be selectively added to the corresponding evaluation representation. For example, in response to adding a connection between nodes, a dependency may be added between tasks corresponding to the nodes. In some examples, a dependency is added only if the tasks do not already share a dependency. Whether the dependency is added or preexisting, all tasks downstream of the dependency are marked dirty.

In response to the deletion of a connection of an authoring representation, a dependency may be selectively deleted from the corresponding evaluation representation. For example, a dependency between two tasks is deleted if the connection deleted between nodes is the only connection between the two nodes. All tasks downstream of the task(s) corresponding to the nodes associated with the deleted connection are marked dirty.

In some examples, deletion of the connection may result in one or more dependencies being added to the evaluation representation as well. Dependencies of the evaluation representation may be optimized and as a result, one or more dependencies may be consolidated and/or deleted. If, as a result of a deleted connection, one or more existing optimizations are no longer enforceable, dependencies may be added to an evaluation representation to maintain proper translation of the authoring representation to the evaluation representation.

In response to a value of a node of an authoring representation being set (e.g., setting a value of an input attribute), one or more tasks may be marked dirty. For example, a value of a node may be set to a particular value (or input) and cause all tasks downstream from the task corresponding to the node to be marked dirty. Furthermore, in some examples, if a value of a simulation node is set, tasks in one or more other frames (e.g., dependent frames) may be marked dirty as well.

The variable global default block 502 may provide a default value for any number of value types. As an example, the variable global default block may provide a default value for each float, integer, and/or string of the system.

The node type default block 504 may provide a default value for any number of value types for nodes of a particular type. For example, the node type default block 504 may provide a default value for each float, integer, and/or string of the system for all input nodes. Default values provided by the node type default block 504 may supersede values provided by the variable global default block 502 in some examples. Example dependency graphs, as described herein, may utilize any number of node type default blocks 504. In some examples, a node type default block 504 may be used for each value type used by the dependency graph and in other examples; a node type default block may be used for less than all value types used by the dependency graph.

In some examples, values provided by the variable global default block 502 and the node type default block 504 are not duplicated for specific nodes, but rather maintained in a data structure (e.g., table). Accordingly, each default value may be maintained and/or adjusted by way of a single value stored in the data structure. By providing default values in this manner, each default value may be modified by adjusting a single value, and accordingly, the number of values that need be stored in memory may be reduced. This may be particularly advantageous when storing relatively large vector values, such as those used in computer animation applications.

The node instance block 506 may provide values for any number of value types for a particular node. For example, the node type default block 504 may provide values for each float, integer, and/or string of the node. Values provided by the node instance block 506 may supersede values provided by the variable global default block 502 and the node type default block 504 in some examples. Any number of nodes of an authoring representation may be associated with a respective node instance block 506 such that values of each node may be individually specified.

In some examples, a node may be associated with values of multiple dimensions. A node may reference and/or provide values of multiple attributes across a plurality of frames. For example, a frame of a sequence of frames may be rendered, as described. Values generated during evaluation of the frame may be stored for one or more nodes of the authoring representation, and in particular, may be stored for one or more attributes of the one or more nodes. In subsequent frames of the sequence, the stored values may be reused for evaluation, for instance, where a value of the attribute remains constant. Values for any number of frames and for any number of attributes may be stored. In this manner, computational requirements during evaluation may be reduced.

Turning back to FIG. 3, in some examples, one or more elements of an evaluation representation may be implemented such that evaluation of the evaluation representation is optimized. Such optimization may minimize one or more aspects of evaluation planning and as a result provide more computationally efficient evaluation, particularly in applications requiring frequent modifications to corresponding authoring representations.

In some embodiments, dependencies of an evaluation representation may be optimized. In some instances, for example, one or more connections of an authoring representation need not correspond to a respective dependency of an evaluation representation. With reference to FIG. 3A, modifying the authoring representation 300 to provide the authoring representation 325 may include adding a connection 324 between the nodes 302 and 304. However, because the nodes 302 and 304 already share a connection 310, no additional dependency need be added to the corresponding evaluation representation. In this manner, multiple connections between nodes may correspond to a single dependency between corresponding tasks, and as a result, fewer dependencies need be considered during evaluation planning.

Dependencies may be optimized in other ways as well. With reference to FIGS. 2A-2B, for example, an input of the node 206 is connected to an input of the node 208 via connection 222. The input of the node 208 is further connected to an output of the node 224 via connection 224. Thus, while the input of the node 206 is connected to an input of the node 208, the input received by the input of the node 206 is provided by the output of the node 204. Accordingly, when translated to the corresponding evaluation representation, the task 256, corresponding to the node 206, may depend from the task 254, corresponding to the node 204 and no dependency between the tasks 256 and 258 is implemented. Moreover, because the task 256 does not depend from the task 258, each of the tasks 256, 258 may be evaluated in parallel.

Tasks of evaluation representations may be optimized as well. For example, if the evaluation representation is updated such that a task of the evaluation representation has a single upstream task or a single downstream task, the task may be combined with the single upstream task or the single downstream task.

Figure 4:
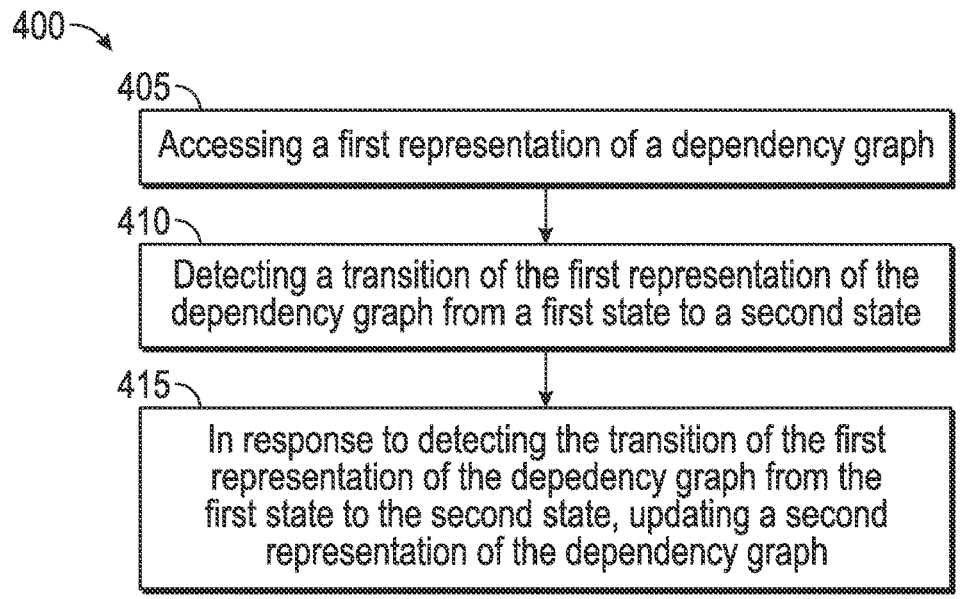
FIG. 4 illustrates an exemplary process for updating an evaluation representation of a dependency graph according to an embodiment of the present invention.
Figure 5:
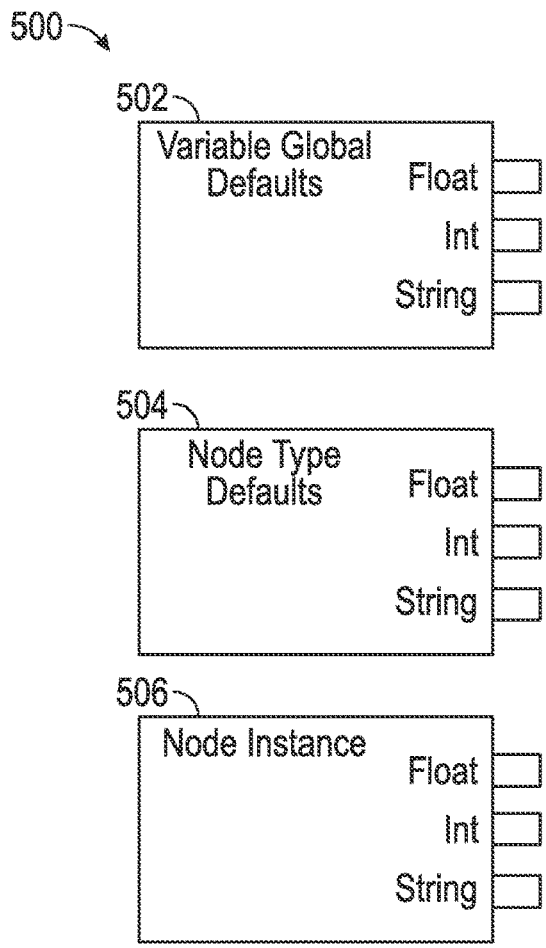
FIG. 5 illustrates an exemplary control value access hierarchy according to an embodiment of the present invention.

FIG. 4 illustrates an exemplary process 400 for updating an evaluation representation of a dependency graph according to an embodiment of the present invention. At a step 405, a first representation of a dependency graph is accessed. The first representation may, for instance, be an authoring representation, such as the authoring representation 200 of FIG. 2A or the authoring representation 300 of FIG. 3A. Accessing the first representation may include viewing the first representation and/or modifying the first representation. The first representation may be modified, for instance, by adding a node to or deleting a node from the first representation, adding a connection to or deleting a connection from the first representation, or setting a value of one or more nodes of the first representation. In some examples, accessing the first representation may include initially generating the first representation.

At a step 410, a transition of the first representation of the dependency graph from a first state to a second state is detected. The transition may, for example, include detecting the access of the first representation at the step 405. For instance, one or more modifications of the first representation may be detected. In another example, detecting a transition may include detecting a user request for an update to a second representation of the dependency graph. In yet another example, detecting a transition may include determining that the first representation has not been modified for a predetermined period of time.

At a step 415, in response to detecting the transition of the first representation of the dependency graph from the first state to the second state, a second representation of the dependency graph may be updated. The second representation of the dependency graph may, for instance, be an evaluation representation, such as the evaluation representation 250 of FIG. 2B or the evaluation representation 350 of FIG. 3B. Updating the second representation of the dependency graph may include adding a task to or deleting a task from the second representation, adding a dependency to or deleting a dependency from the second representation, or optimizing one or more tasks or dependencies of the second representation.

In some examples, the second representation may be updated based on the transition of the first representation from the first state to the second state. For example, in response to the addition or deletion of a node in the first representation, a task may be added to or deleted from the second representation, respectively. Similarly, in response to the addition or deletion of a connection in the first representation, a dependency may be selectively added to or deleted from the second representation, respectively. In some examples, the second representation may be updated in accordance with a set of update rules. The update rules may, for instance, specify the manner in which the second representation is to be updated in response to a modification of the first representation.

Figure 6:
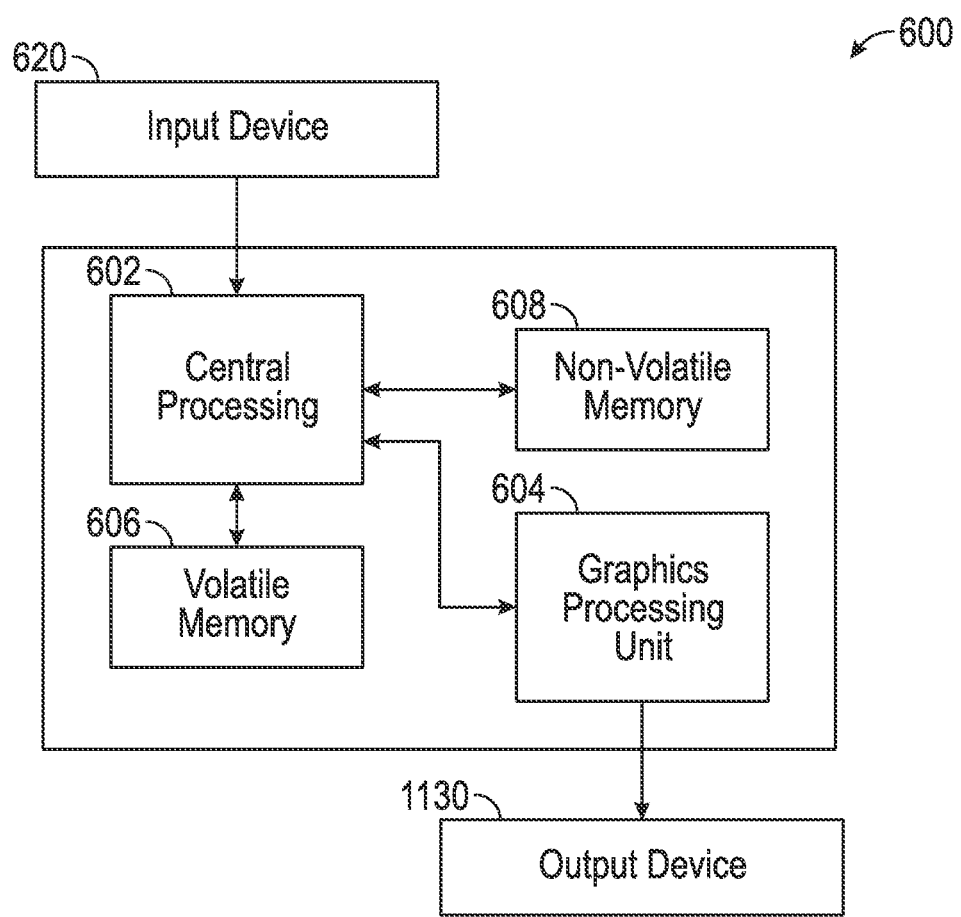
FIG. 6 illustrates an exemplary animation system according to an embodiment of the present invention.

The process 400 may be performed using one or more systems, such as the system 600 of FIG. 6. Operations in process 400 are, optionally, combined, divided, reordered, and/or performed in addition to one or more other steps.

Further, the process 400 has been described herein with respect to graphics processing applications, particularly with respect to animation rendering applications. It will be appreciated by one having skill in the art, however, that the process 400 may be applied to a number of other applications including but not limited to database management applications, visual or parallel programming languages, and hardware development tools.

FIG. 6 illustrates an exemplary animation system 600 that may be used to implement the dependency graph evaluation process discussed above. The process may be implemented, for example, in either hardware or in software stored on a non-transitory computer-readable storage medium. The system may be configured to evaluate a dependency graph, a node within a dependency graph, or an output attribute of a dependency graph. The system may be further configured to receive input from a user and to display graphics, an image, or scene of an animation based on the evaluation.

The animation system 600 may be configured to receive user input from an input device 620. The input device 620 may be any device that receives input from the user and transmits it to the animation system 600. For example, the input device may be a keyboard, a mouse, a tablet, a stylus, or the like. Those skilled in the art will recognize that other types of input devices may also be used.

The animation system 600 may be configured to output graphics, images, or animation to a display device 630. The display device 630 may be any device that receives data from the animation system 600 and presents it to the user. For example, the display device 630 may be a liquid crystal display, a set of light emitting diodes, a projector, or the like. Those skilled in the art will recognize that other types of output devices may also be used.

The animation system 600 may comprise a central processing unit 602. The central processing unit 602 may comprise one or more processing cores. The central processing unit 602 may be coupled to and able to communicate with the input device 620. Although the animation system 600 is illustrated with one central processing unit 602, the animation system 600 may have multiple processing units. The animation system 600 may also comprise a graphics processing unit 604. The graphics processing unit 604 may be dedicated to processing graphics related data. The graphics processing unit 604 may comprise a single processing core or multiple processing cores. Although the animation system 600 is illustrated with one graphics processing unit 604, the animation system 600 may have a plurality of graphics processing units. The central processing unit 602 and/or the graphics processing unit 604 may be coupled to and able to communicate data to the output device 630.

In one example, the animation system 600 may comprise one or more processors and instructions stored in a non-transitory computer readable storage medium, such as a memory or storage device, that when executed by the one or more processors, perform the processes for evaluating an output attribute of a dependency graph as described above. In the context of the embodiments described herein, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 600 may comprise volatile memory 606 and/or any non-transitory computer readable storage medium, in communication with the central processing unit 602. The volatile memory 606 may be, for example, random access memory, such as dynamic random access memory or static random access memory, or any other type of volatile memory. The volatile memory 606 may be used to store data or instructions during the operation of the animation system 600. Those skilled in the art will recognize that other types of volatile memory may also be used.

The animation system 600 may also comprise non-volatile memory 608, which is a non-transitory computer readable storage medium, in communication with the central processing unit 602. The non-volatile memory 608 may include flash memory, hard disks, magnetic storage devices, read-only memory, or the like. The non-volatile memory 608 may be used to store animation data, dependency graph data, computer instructions, or any other information. Those skilled in the art will recognize that other types of non-volatile memory may also be used.

The animation system 600 is not limited to the devices, configurations, and functionalities described above. For example, although a single volatile memory 606, non-volatile memory 608, central processing unit 602, graphics processing unit 604, input device 620, and output device 630 are illustrated, a plurality of any of these devices may be implemented internal or external to the animation system 600. In addition, the animation system 600 may comprise a network access device for accessing information on a network, such as an internal network or the Internet. Those skilled in the art will recognize other configurations of the animation system 600 may be used.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

What is claimed is:

1. A method, comprising:
    accessing, using one or more processors, a first representation of a dependency graph, the first representation of the dependency graph having a first type and including a plurality of nodes, wherein the dependency graph is a dependency graph for rendering one or more animation frames;
    detecting, using the one or more processors, a transition of the first representation of the dependency graph from a first state to a second state;
    in response to detecting the transition of the first representation of the dependency graph from the first state to the second state, updating, using the one or more processors, a second representation of the dependency graph, the second representation having a second type different than the first type and including a plurality of tasks corresponding to the plurality of nodes, wherein:
    the updating includes marking at least one of the plurality of tasks to indicate that the at least one of the plurality of tasks requires evaluation, wherein:
        the marking is based on a rule corresponding to the transition of the first representation of the dependency graph;
        the marking includes determining a type of the transition of the first representation of the dependency graph; and
        the rule associates the at least one of the plurality of tasks with the determined type of transition of the first representation of the dependency graph; and
    rendering the one or more animation frames based on the updated second representation of the dependency graph.

2. The method of claim 1, wherein the first representation is an authoring representation and the second representation is an evaluation representation.

3. The method of claim 1, wherein a dependency between first and second tasks of the plurality of tasks is based on a connection between first and second nodes of the plurality of nodes.

4. The method of claim 1, wherein detecting the transition of the first representation of the dependency graph from the first state to the second state comprises:
    detecting a new node in the first representation of the dependency graph.

5. The method of claim 4, wherein updating the second representation comprises:
    determining a type of the new node; and
    adding a task to the second representation, the task corresponding to the new node and based on the type of the new node.

6. The method of claim 1, further comprising:
    optimizing dependencies of the plurality of tasks.

7. The method of claim 6, wherein optimizing dependencies of the plurality of tasks includes associating a plurality of connections with a dependency.

8. The method of claim 6, wherein optimizing dependencies of the plurality of tasks includes associating a plurality of dependencies with a connection.

9. The method of claim 1, wherein a value of a first node of the plurality of nodes is associated with a value type default and a value of a second node of the plurality of nodes is associated with a node type default.

10. The method of claim 1, wherein the dependency graph corresponds to one or more three-dimensional objects.

11. A non-transitory computer-readable storage medium storing one or more programs, the one or more programs comprising instructions, which when executed by one or more processors of an electronic device, cause the electronic device to:
    access, using the one or more processors, a first representation of a dependency graph, the first representation of the dependency graph having a first type and including a plurality of nodes, wherein the dependency graph is a dependency graph for rendering one or more animation frames;
    detect, using the one or more processors, a transition of the first representation of the dependency graph from a first state to a second state;
    in response to detecting the transition of the first representation of the dependency graph from the first state to the second state, update, using the processor, a second representation of the dependency graph, the second representation having a second type different than the first type and including a plurality of tasks corresponding to the plurality of nodes, wherein:
    the updating includes marking at least one of the plurality of tasks to indicate that the at least one of the plurality of tasks requires evaluation, wherein:
        the marking is based on a rule corresponding to the transition of the first representation of the dependency graph;
        the marking includes determining a type of the transition of the first representation of the dependency graph; and
        the rule associates the at least one of the plurality of tasks with the determined type of transition of the first representation of the dependency graph; and
    render the one or more animation frames based on the updated second representation of the dependency graph.

12. The non-transitory computer-readable storage medium of claim 11, wherein the first representation is an authoring representation and the second representation is an evaluation representation.

13. The non-transitory computer-readable storage medium of claim 11, wherein a dependency between first and second tasks of the plurality of tasks is based on a connection between first and second nodes of the plurality of nodes.

14. The non-transitory computer-readable storage medium of claim 11, wherein the instructions for detecting the transition of the first representation of the dependency graph from the first state to the second state comprise instructions for:

detecting a new node in the first representation of the dependency graph.

15. The non-transitory computer-readable storage medium of claim 14, wherein the instructions for updating the second representation comprise instructions for:
  determining a type of the new node; and
  adding a task to the second representation, the task corresponding to the new node and based on the type of the new node.

16. The non-transitory computer-readable storage medium of claim 11, further comprising instructions for: optimizing dependencies of the plurality of tasks.

17. The non-transitory computer-readable storage medium of claim 16, wherein the instructions for optimizing dependencies of the plurality of tasks comprise instructions for associating a plurality of dependencies with a connection.

18. The non-transitory computer-readable storage medium of claim 11, wherein a value of a first node of the plurality of nodes is associated with a value type default and a value of a second node of the plurality of nodes is associated with a node type default.

19. The non-transitory computer-readable storage medium of claim 11, wherein the dependency graph corresponds to one or more three-dimensional objects.

20. An electronic device, comprising:
  one or more processors;
  a memory; and
  one or more programs, wherein the one or more programs are stored in the memory and configured to be executed by the one or more processors, the one or more programs including instructions for:
    accessing a first representation of a dependency graph, the first representation of the dependency graph having a first type and including a plurality of nodes, wherein the dependency graph is a dependency graph for rendering one or more animation frames;
    detecting a transition of the first representation of the dependency graph from a first state to a second state;
    in response to detecting the transition of the first representation of the dependency graph from the first state to the second state, updating a second representation of the dependency graph, the second representation having a second type different than the first type and including a plurality of tasks corresponding to the plurality of nodes, wherein:
      the updating includes marking at least one of the plurality of tasks to indicate that the at least one of the plurality of tasks requires evaluation, wherein:
        the marking is based on a rule corresponding to the transition of the first representation of the dependency graph;
        the marking includes determining a type of the transition of the first representation of the dependency graph, and
        the rule associates the at least one of the plurality of tasks with the determined type of transition of the first representation of the dependency graph; and
      rendering the one or more animation frames based on the updated second representation of the dependency graph.

21. The electronic device of claim 20, wherein the first representation is an authoring representation and the second representation is an evaluation representation.

22. The electronic device of claim 20, wherein a dependency between first and second tasks of the plurality of tasks is based on a connection between first and second nodes of the plurality of nodes.

23. The electronic device of claim 20; wherein detecting the transition of the first representation of the dependency graph from the first state to the second state comprises:
  detecting a new node in the first representation of the dependency graph.

24. The electronic device of claim 23, wherein updating the second representation comprises:
  determining a type of the new node; and
  adding a task to the second representation, the task corresponding to the new node and based on the type of the new node.

25. The electronic device of claim 20, wherein the instructions further comprise instructions for:
  optimizing dependencies of the plurality of tasks.

26. The electronic device of claim 25, wherein optimizing dependencies of the plurality of tasks includes associating a plurality of connections with a dependency.

27. The electronic device of claim 20, wherein a value of a first node of the plurality of nodes is associated with a value type default and a value of a second node of the plurality of nodes is associated with a node type default.

28. The electronic device of claim 20, wherein the dependency graph corresponds to one or more three-dimensional objects.

* * * * *

UNITED STATES PATENT AND TRADEMARK OFFICE
CERTIFICATE OF CORRECTION

PATENT NO. : 10,297,064 B2
APPLICATION NO. : 14/860631
DATED : May 21, 2019
INVENTOR(S) : Esteban D. Papp et al.

Page 1 of 1

It is certified that error appears in the above-identified patent and that said Letters Patent is hereby corrected as shown below:

In the Claims

In Claim 20, at Column 16, Line 9, delete "graph," and insert -- graph; --, therefor.

In Claim 23, at Column 16, Line 22, delete "claim 20;" and insert -- claim 20, --, therefor.

Signed and Sealed this
Third Day of September, 2019

Andrei Iancu
*Director of the United States Patent and Trademark Office*